May 19, 1959 H. S. BLANKS 2,887,417

PROCESSES FOR THE MANUFACTURE OF ALLOY TYPE SEMI-CONDUCTOR RECTIFIERS AND TRANSISTORS

Filed March 15, 1957

INVENTOR:
Henry Stanley Blanks
BY:
Baldwin & Wight
ATTORNEYS

United States Patent Office 2,887,417

Patented May 19, 1959

2,887,417

PROCESSES FOR THE MANUFACTURE OF ALLOY TYPE SEMI-CONDUCTOR RECTIFIERS AND TRANSISTORS

Henry Stanley Blanks, Coo Gee, New South Wales, Australia, assignor to Marconi's Wireless Telegraph Company Limited, London, England, a company of Great Britain Application March 15, 1957, Serial No. 646,393

Claims priority, application Great Britain April 27, 1956

4 Claims. (Cl. 148—1.5)

Figure 1:
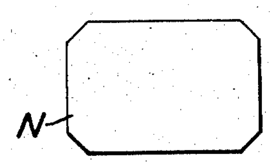

This invention relates to processes for the manufacture of alloy type semi-conductor rectifiers and transistors. Though not limited to its application thereto the invention is particularly suitable for the manufacture of semi-conductor rectifiers and transistors of the type comprising a germanium wafer having thereon an injector spot or pellet of indium. The invention, however, is also applicable to alloy type semi-conductor rectifiers and transistors in which the crystal material is other than germanium and the injector material other than indium.

It is necessary in the manufacture of devices of the kind to which the invention relates to predetermine the shape and location of the injector spot or pellet on the crystal wafer. At the present time this is usually done by the use of appropriately shaped recessed jigs made of graphite, stainless steel or other suitable material to determine the shape and position of the injector metal relative to the crystal wafer. This jig method of manufacture, however, is extremely difficult to practice satisfactorily and has other disadvantages. In the first place adequate flushing of the neighborhood of the junction during the alloying process is extremely difficult to achieve; the jigs are expensive and difficult to make; the injector metal is restrained by the jig so that it is not free to take up its natural angle of contact in relation to the germanium; and there is a marked tendency for gas bubbles to be trapped at the interface between the injector metal and the wafer. A further important practical defect of the jig method is that it does not readily lend itself to the manufacture of rectifiers and transistors of special or irregular shapes.

The object of the invention is to avoid the defects of the known jig methods above described and to provide improved methods of making alloy type semi-conductor rectifiers or transistors which shall be relatively simple and economical to practice; shall be satisfactory in the results achieved and shall be applicable to the production of devices of almost any required shape.

According to this invention a method of manufacturing an alloy type semi-conductor or rectifier or transistor includes the steps of forming a sheet of support metal of required shape and size; forming a sheet of injector metal of approximately the same shape and size as the support sheet and of a volume such that, when melted upon and caused to wet the support metal, it will take by surface tension effect, a convexly curved surface of the face remote from the support metal; heating the two sheets in superposed contact in vacuum or in an inert atmosphere to a temperature at which the injector metal melts upon and wets the carrier, i.e. the support metal; allowing the injector metal to solidify; placing the now united sheet structure in contact with a semi-conductor wafer with the curved injector metal face of the structure against the wafer; and heat treating to alloy the injector metal with the metal of the wafer to form an injector spot or pellet.

Preferably the last step in the above defined process, i.e. the alloying step, is carried out by a method in which the temperature is raised in an inert atmosphere or in vacuum to a value which is only a little above that at which the injector metal becomes molten and wets the wafer surface; an oxide skin is formed on the surface of the molten injector metal; the temperature is further raised to final alloying temperature; and cooling is then permitted to take place.

In the application of the invention to the manufacture of devices in which the crystal metal is germanium and the injector metal is indium, the carrier or support metal used is preferably nickel. It is, however, not essential to use nickel and other metals of suitable physical properties may be employed. For example, it is possible to make the carrier of tinned copper, though this it not preferred owing to the well known disadvantages to the use of copper in devices of the kind in question.

Figure 5:
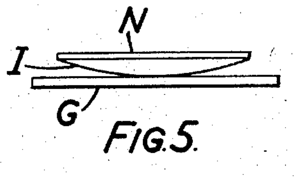
Figure 6:
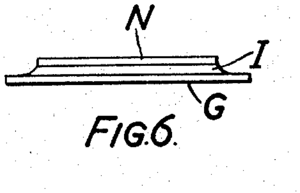
Figure 7:
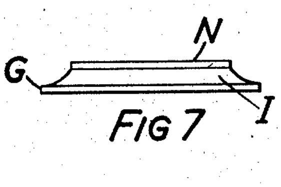
Figure 8:
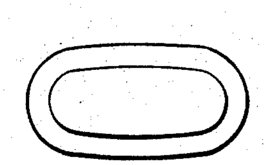

The invention is illustrated in and further explained in connection with the accompanying drawings in which Figs. 1 to 6 illustrate various stages in a preferred method in accordance with the invention and Figs. 7 and 8 illustrate a modification.

Figure 2:
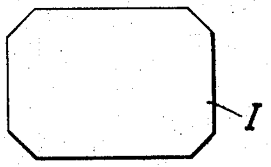
Figure 3:
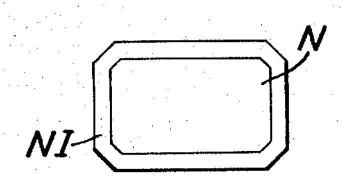
Figure 4:
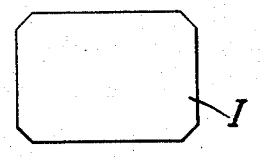

Referring to Figs. 1 to 6, a thin sheet N (for example, 0.015 cm. thick) of nickel is formed to the shape of the junction ultimately desired. This sheet is represented in Fig. 1 as approximately rectangular with the corners cut off. A sheet I of indium for example approximately 0.038 cm. thick, and of approximately the same shape as the sheet N is also formed. The total volume of the indium sheet is so chosen that if the metal were spread into a sheet 0.038 cm. thick and it were then placed over the sheet of nickel, it would overlap the nickel by about 0.1 cm. all around. This is represented in Fig. 2 by showing the sheet I as similar to the sheet N but a little larger. It might, however, be of the same area if it were correspondingly thicker. The sheet N is flattened, cleared of grease, washed and dried. The sheet I is washed in $CCl_4$, boiled in demineralized water, dried and flattened. The two sheets are then placed over one another on a soapstone tray in an oven and, if desired, covered with a light soapstone weight. The oven temperature is then raised to about 500° C. (the temperature is not critical) while filled with an atmosphere of hydrogen. The result is to cause the indium to melt and flow over the surface of the nickel which it wets. Because of the volume of the indium it will form, by surface tension effect, a convexly curved face on the side remote from the nickel. It is then allowed to cool and the result will be as schematically illustrated in Figs. 3 and 4 and in the upper part of Fig. 5. Fig. 3 is a view of one face of the united nickel and indium sheets; Fig. 4 is a view of the other face; and the upper part of Fig. 5 is a schematic representation of the nature of an edge view section. As will be seen from these figures the indium creeps to some extent round the edge of the nickel to form an alloyed rim NI round one edge of the opposite nickel face, while the other face, which will be of indium only, will be markedly convexly curved as best shown in the upper part of Fig. 5.

After cooling the nickel with indium thereon is removed from the furnace and placed on a germanium wafer G (Fig. 5) which has been prepared in usual well known fashion and which rests on a pre-tinned base tab (not shown). The sheet of nickel with indium thereon is placed on the germanium wafer, indium side downwards, as shown in Fig. 5 and a very thin piece of indium (not shown) cut approximately to the shape of the sheet of nickel with indium thereon but slightly smaller and which has been washed and dried, is placed on the top surface of the nickel sheet N (i.e. the face of the nickel sheet opposite the face having indium thereon). A light soapstone weight may be placed on top. This assembly is then heat treated in hydrogen to alloy the indium with the germanium. This final heat treating process may effectively be carried out at a temperature of about 520° C. The purpose of the additional top sheet of indium placed over the nickel with indium thereon is to facilitate the subsequent soldering of connection wires. Its provision, however, is not necessary. The result of the final heat treatment for alloying is schematically represented in Fig. 6 which corresponds to Fig. 5 and indicates the relations of the parts (except the top indium sheet which is not shown) after alloying. It will be particularly noted in Fig. 6 that the edges of the indium follow the natural contour meeting the germanium wafer at an acute angle. This is highly desirable and virtually impossible to achieve when jigs are employed.

The invention may be applied to the manufacture of devices of almost any desired shape, however irregular. For example, Figs. 7 and 8 are mutually perpendicular views of a device which is of elliptical ring shape. The shape of the final device is, of course, determined by the shape adopted for the original sheets N and I.

Among the advantages of the invention are:

(1) Almost any desired shape for the final device is readily obtainable.

(2) Exact geometrical relationship between the indium and the germanium wafer relative to the edges or crystal orientation thereof can be obtained.

(3) Gas flow past the periphery of the junction (in the heating alloying step in the process) is not hindered by the presence of any jig.

(4) The cost and complexity of jigs are avoided altogether, and (5) The convex surface of the indium attained as a result of melting the indium on the nickel ensures, in the final alloying step in the process, initial central wetting of the germanium by the indium followed by progressive wetting of the whole junction area so that there are no trapped gas pockets and no dragging or "tailing" of the indium due to multi-point initial wetting.

I claim:

1. A method of manufacturing alloy type semi-conductors, rectifiers and transistors, comprising the steps of forming a sheet of support metal of required shape and size, forming a sheet of injector metal of approximately the same shape and size as the support sheet and of a volume such that, when melted upon and caused to wet the support metal, it will take by surface tension effect, a convexly curved surface of the face remote from the support metal, heating the two sheets in superposed contact in vacuum to a temperature at which the injector metal melts upon and wets the support metal, allowing the injector metal to solidify, placing the now united sheet structure in contact with a semi-conductor wafer with the curved injector metal face of the structure against the wafer, raising the temperature of the injector metal and the wafer in an inert atmosphere to a value which is only a little above that at which the injector metal becomes molten and wets the wafer surface, forming an oxide skin on the surface of the molten injector metal, raising the temperature further to final alloying temperature, and cooling to form an injector spot on the wafer.

2. A method as set forth in claim 1 wherein the crystal metal is germanium and the injector metal is indium, and the support metal is nickel.

3. A method of manufacturing alloy type semiconductors, rectifiers and transistors, comprising the steps of forming a sheet of support metal of required shape and size, forming a sheet of injector metal of approximately the same shape and size as the support sheet and of a volume such that, when melted upon and caused to wet the support metal, it will take by surface tension effect, a convexly curved surface of the face remote from the support metal, heating the two sheets in superposed contact in an inert atmosphere to a temperature at which the injector metal melts upon the wets and the support metal, allowing the injector metal to solidify, placing the now united sheet structure in contact with a semi-conductor wafer with the curved injector metal face of the structure against the wafer, raising the temperature of the injector metal and the wafer in a vacuum to a value which is only a little above that at which the injector metal becomes molten and wets the wafer surface, forming an oxide skin on the surface of the molten injector metal, raising the temperature further to final alloying temperature, and cooling to form an injector spot on the wafer.

4. A method as set forth in claim 3 wherein the crystal metal is germanium and the injector metal is indium and the support metal is nickel.

References Cited in the file of this patent

UNITED STATES PATENTS

| | | |
|---|---|---|
| 2,702,360 | Giacoletto | Feb. 15, 1955 |
| 2,703,855 | Koch et al. | Mar. 8, 1955 |
| 2,730,663 | Harty | Jan. 10, 1956 |
| 2,757,323 | Jordan et al. | July 31, 1956 |
| 2,798,013 | Irmler | July 2, 1957 |
| 2,825,667 | Mueller | Mar. 4, 1958 |
| 2,830,920 | Colson | Apr. 15, 1958 |